July 21, 1936.  O. JACOBSEN  2,048,386
LUBRICATED PLUG VALVE
Filed Dec. 27, 1935  2 Sheets-Sheet 1

INVENTOR.
OYSTEIN JACOBSEN
BY
ATTORNEY

July 21, 1936.  O. JACOBSEN  2,048,386

LUBRICATED PLUG VALVE

Filed Dec. 27, 1935  2 Sheets-Sheet 2

INVENTOR.
OYSTEIN JACOBSEN
BY James C. Bradley
ATTORNEY

Patented July 21, 1936

2,048,386

UNITED STATES PATENT OFFICE 2,048,386

LUBRICATED PLUG VALVE

Oystein Jacobsen, Dayton, Ohio, assignor to The Duriron Company, Inc., a corporation of New York Application December 27, 1935, Serial No. 56,330

6 Claims. (Cl. 251—93)

Figure 1:
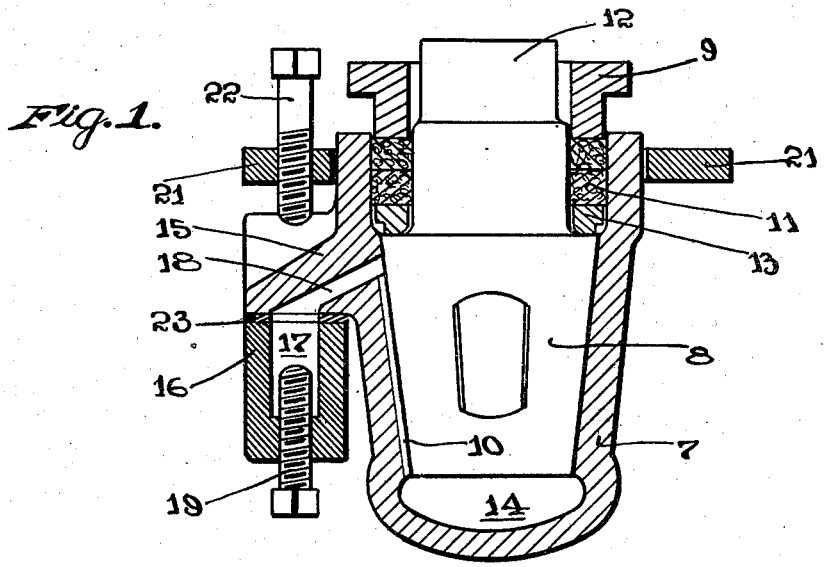
Figure 2:
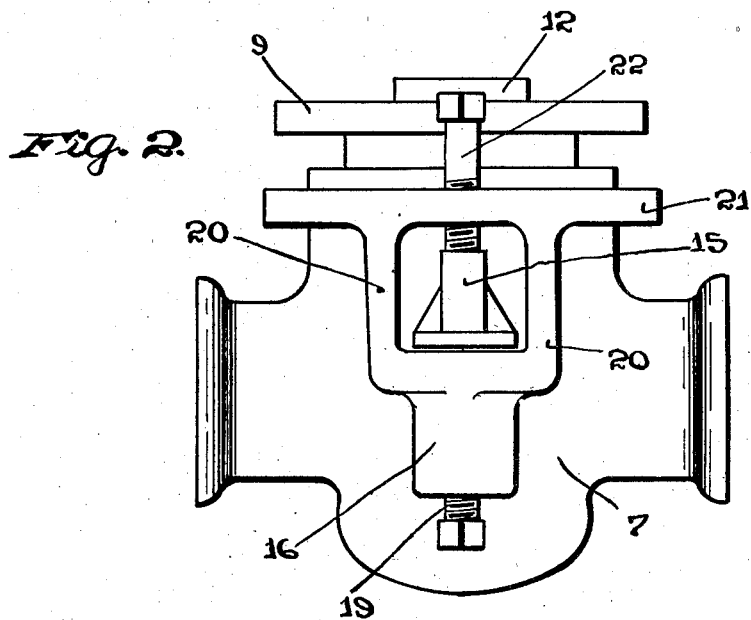
Figure 3:
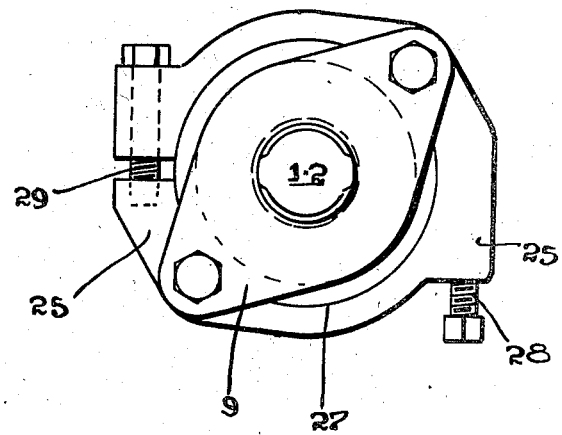
Figure 5:
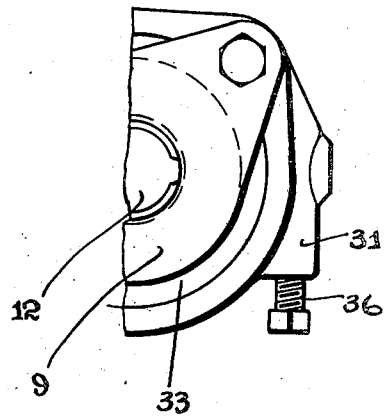
Figure 4:
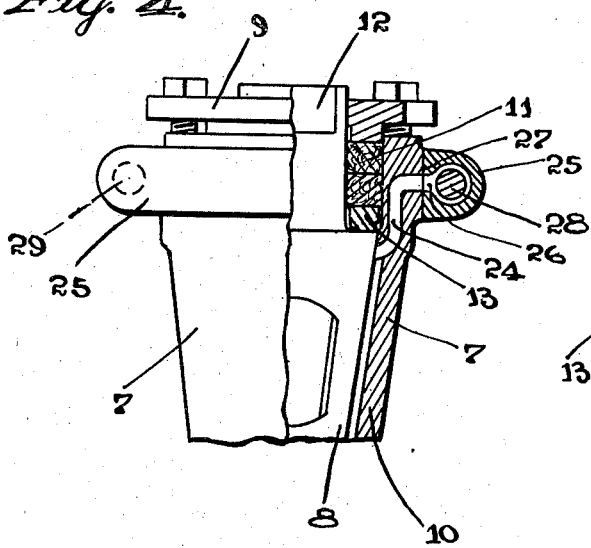
Figure 6:
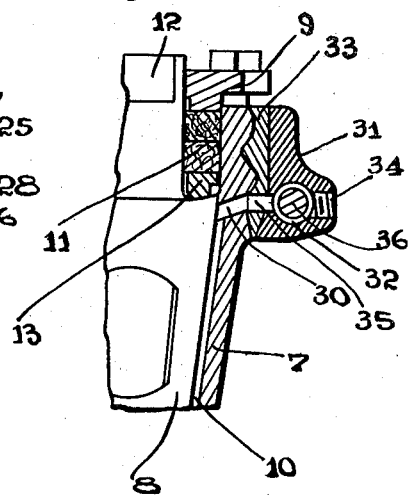

The invention relates to lubricated cocks or valves particularly of the type constructed in part of acid resisting material, although the invention is not limited to valves of such composition. It has for its principal objects the provision of a valve of the kind specified having improved means for lubricating the plug and lifting it from its seat in case it becomes stuck, and the provision of a construction in which parts of acid or other corrosion resisting compositions are combined in an advantageous manner with parts of cheaper, readily machinable metals. Certain embodiments of the invention are illustrated in the accompanying drawings, wherein:

Figure 1 is a vertical section through the valve. Fig. 2 is a side elevation. Figs. 3 and 4 show a modification, Fig. 3 being a plan view and Fig. 4 a partial side elevation and partial vertical section. And Figs. 5 and 6 show another modification, Fig. 5 being a partial plan view, and Fig. 6 a partial vertical section.

Referring to Figs. 1 and 2, 7 is the valve casing, 8 is the plug or cock, and 9 is the follower of the stuffing box, these parts being made, in this case, of corrosion resisting composition, although this is not necessarily the case. The plug is tapered, as shown, and lubricating grooves 10 are provided at the surface of the plug. Suitable packing 11 is employed around the stem 12 of the plug, such packing lying above the wear ring 13, which is also preferably of corrosion resisting composition. The follower is held in position and moved downward by bolts which are not shown. The upper end of the plug shank is formed to receive a handle or wrench for turning it.

Located beneath the plug is a lubricant chamber 14, with which the grooves 10 communicate at their lower ends. The casing has projecting from one side, an angular abutment 15, whose lower face lies in a horizontal plane and serves as a seat for the walls of a member 16 having a cavity 17 for lubricant. A passage 18 extends through the wall of the casing with its inner end in registry with the upper end of one of the grooves 10. A screw 19 is threaded through the wall of the member 16, and when this screw is advanced, it applies pressure to the lubricant in the cavity 17 feeding it through the passage 18 and the groove 10 to the chamber 14. The operation of the screw, at suitable intervals, insures the lubrication of the plug, and if such plug sticks on its seat, it may be freed by turning the screw 19 to such an extent that the pressure accumulated in the chamber 14 lifts the plug and frees it.

The member 16 which may be of ordinary metal which is readily machinable, is integral with the yoke 20 and collar 21, shown in Fig. 2. The collar extends clear around the valve casing, and serves to hold the member 16 from movement away from the casing. Threaded through the upper side of the yoke 20 is a clamping screw 22, whose lower end engages the top of the abutment 15, as shown. When this screw is advanced, the member 16 is pulled upward against the seating face of the abutment, so as to secure a seal, a gasket 23 being employed to insure a tight joint.

Figs. 3 and 4 illustrate a modification, in which similar parts are numbered as set forth in connection with Figs. 1 and 2. As in the construction of Figs. 1 and 2, a passage 24 is provided leading through the wall of the casing, and communicating at its upper end with one of the grooves 10 leading to the chamber 14 beneath the plug. Lying over the outer end of the passage is a member 25 in the form of a split collar or ring having therein a cavity 26 for lubricant. The meeting surfaces of the casing and ring at 27, are ground, so as to provide a seal between the parts. A screw 28 is threaded through the wall of the cavity 26 and performs the function of the screw 19 of Figs. 1 and 2. The ends of the collar carry the clamping screw 29 by means of which the collar is contracted so that it fits the casing tightly and insures a seal between the surfaces at 27. The valve casing and the plug are of corrosion resisting composition, while the collar 25 may be of any ordinary metal which is readily machinable.

Figs. 5 and 6 illustrate another modification, in which similar parts are numbered as set forth in Figs. 1 and 2. As in the constructions heretofore described, a passage 30 is provided leading through the wall of the casing and communicating at its upper end with one of the grooves 10 leading to the chamber beneath the plug. Lying over the outer end of the passage is a member 31 in the form of a solid ring or collar having therein a cavity 32 for lubricant. The collar has a loose fit around the casing and the opposing faces of the casing and the collar are formed as shown in Fig. 6. Into the slot between the parts, a packing 33 of fused metal is poured, such metal, on hardening constituting a means for holding the collar securely in position. An opening 34 is provided in the wall of the cavity 32 to permit of the insertion of a tool to remove the core employed at the point 35 during the pouring of the packing metal. This opening is subsequently sealed with a set screw. A screw 36 is threaded through the wall of the cavity 32 and performs the function of the screw 19 of Figs. 1 and 2.

What I claim is:

1. In combination in a plug cock, a casing open at its upper end having a tapering seat and a chamber for lubricant below the seat, a tapering plug valve fitting the seat, a groove being provided longitudinally of the meeting surfaces of the plug and seat opening at its lower end into said chamber, an abutment integral with the casing projecting laterally from the upper portion of the casing with a seating surface on its lower side, a passage extending through the wall of the casing and abutment to said seating surface and communicating at its inner end with said groove, a lubricant chamber engaging said seating surface on the abutment and having its interior in communication with the end of said passage, clamping means securing the chamber in position, and a screw extending through the wall of said last chamber and adapted, when screwed inward, to apply pressure to the lubricant in the chamber.

2. In combination in a plug cock, a casing open at its upper end having a tapering seat and a chamber for lubricant below the seat, a tapering plug valve fitting the seat, a groove being provided longitudinally of the meeting surfaces of the plug and seat opening at its lower end into said chamber, an abutment integral with the casing projecting laterally from the upper portion of the casing with a seating surface on its lower side, a passage extending through the wall of the casing and abutment to said seating surface and communicating at its inner end with said groove, a lubricant chamber engaging said seating surface on the abutment and having its interior in communication with the end of said passage, said chamber having a yoke integral therewith extending over the top of the abutment, and a clamping screw carried by the yoke above the abutment engaging the abutment at its lower end, and a screw extending through the wall of said last chamber and adapted, when screwed inward, to apply pressure to the lubricant in the chamber.

3. In combination in a plug cock, a casing open at its upper end having a tapering seat and a chamber for lubricant below the seat, a tapering plug valve fitting the seat, a groove being provided longitudinally of the meeting surfaces of the plug and seat opening at its lower end into said chamber, a passage extending through the wall of the casing, and communicating at its inner end with the upper portion of the groove, a collar surrounding the casing and provided with a chamber for lubricant having its walls integral with the collar and in communication with the outer end of said passage, means for securing the collar to the casing, and a screw extending through the wall of the chamber and adapted, when screwed inward, to apply pressure to the lubricant in said last chamber.

4. In combination in a plug cock, a casing open at its upper end having a tapering seat and a chamber for lubricant below the seat, a tapering plug valve fitting the seat, a groove being provided longitudinally of the meeting surfaces of the plug and seat opening at its lower end into said chamber, a passage extending through the wall of the casing, and communicating at its inner end with the upper portion of the groove, a collar surrounding the casing and provided with a chamber for lubricant having its walls integral with the collar and in communication with the outer end of said passage, means for securing the collar releasably to the casing, and a screw threaded through the wall of such last chamber and adapted, when screwed inward, to apply pressure to the lubricant in the chamber.

5. In combination in a plug cock, a casing open at its upper end having a tapering seat and a chamber for lubricant below the seat, a tapering plug valve fitting the seat, a groove being provided longitudinally of the meeting surfaces of the plug and seat opening at its lower end into said chamber, a passage extending through the wall of the casing and communicating at its inner end with the upper portion of the groove, a split collar surrounding the casing and provided with a chamber for lubricant in communication with the outer end of said passage, clamping means between the ends of the collar for causing them to approach so that the collar grips the casing, and a screw threaded through the wall of such last chamber and adapted, when screwed inward, to apply pressure to the lubricant in the chamber.

6. In combination in a plug cock, a casing open at its upper end having a tapering seat and a chamber for lubricant below the seat, a tapering plug valve fitting the seat, a groove being provided longitudinally of the meeting surfaces of the plug and seat opening at its lower end into said chamber, a passage extending through the wall of the casing and communicating at its inner end with the upper portion of the groove, a one piece metal ring surrounding the casing having a chamber in communication with the outer end of said passage, a metal packing between the inner face of the ring and the casing for securing the ring in place, and a screw extending through the wall of said last chamber and adapted, when screwed inward, to apply pressure to the lubricant in the chamber.

O. JACOBSEN.